US011686524B2

(12) United States Patent
Frattini et al.

(10) Patent No.: US 11,686,524 B2
(45) Date of Patent: *Jun. 27, 2023

(54) FILLING PORTS FOR INSULATED STRUCTURES INCORPORATED WITHIN AN APPLIANCE

(71) Applicant: WHIRLPOOL CORPORATION, Benton Harbor, MI (US)

(72) Inventors: Gustavo Frattini, St. Joseph, MI (US); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,969

(22) Filed: Jan. 4, 2022

(65) Prior Publication Data
US 2022/0128294 A1 Apr. 28, 2022

Related U.S. Application Data

(63) Continuation of application No. 16/637,570, filed as application No. PCT/US2017/055355 on Oct. 5, 2017, now Pat. No. 11,300,354.

(51) Int. Cl.
*F25D 23/06* (2006.01)
*F16L 59/065* (2006.01)
*B29L 31/00* (2006.01)

(52) U.S. Cl.
CPC .......... *F25D 23/064* (2013.01); *F16L 59/065* (2013.01); *B29L 2031/7622* (2013.01); *F25D 2201/14* (2013.01)

(58) Field of Classification Search
CPC .. F25D 23/028; F25D 23/064; F25D 2201/14; F25D 2323/02; F25D 2323/024; F16L 59/065; B29L 2031/7622
See application file for complete search history.

(56) References Cited

U.S. PATENT DOCUMENTS 4,084,291 A * 4/1978 Crowe ...................... E05D 7/02
49/382
4,821,399 A 4/1989 Markley et al.
(Continued)

FOREIGN PATENT DOCUMENTS

CN 1598450 A 3/2005
CN 101539361 A 9/2009
(Continued)

OTHER PUBLICATIONS

Translation JPH02192577A, 4 pages (Year: 1990).*

*Primary Examiner* — Andrew M Roersma
(74) *Attorney, Agent, or Firm* — Price Heneveld LLP

(57) ABSTRACT

An appliance includes an outer wrapper and an inner liner that form a structural cabinet having an insulating cavity defined between the inner liner and the outer wrapper. An elliptical insulation port is defined within the outer wrapper, wherein the elliptical insulation port is configured to allow passage of a cylindrical insulation conduit when the insulation conduit is positioned at an oblique angle relative to the structural cabinet. An insulation material is disposed within the insulating cavity. A sealing cap covers the elliptical insulation port, wherein the sealing cap includes a protrusion that extends at least partially into the insulating cavity.

17 Claims, 8 Drawing Sheets

(56) References Cited

U.S. PATENT DOCUMENTS

| | | | | |
|---|---|---|---|---|
| 5,560,695 | A * | 10/1996 | Pufpaff | B29C 33/10 312/401 |
| 5,695,844 | A * | 12/1997 | Neeser | B23K 33/004 428/920 |
| 6,209,265 | B1 * | 4/2001 | Banicevic | F25D 23/028 49/501 |
| 6,295,787 | B1 | 10/2001 | Lee | |
| 6,858,280 | B2 | 2/2005 | Allen et al. | |
| 7,641,298 | B2 * | 1/2010 | Hirath | F25D 23/065 312/401 |
| 9,435,579 | B1 * | 9/2016 | House | E05D 7/081 |
| 9,587,876 | B1 | 3/2017 | Powell | |
| 11,300,354 | B2 * | 4/2022 | Frattini | F16L 59/065 |
| 2003/0151339 | A1 | 8/2003 | Reed et al. | |
| 2013/0257257 | A1 | 10/2013 | Cur et al. | |
| 2014/0346942 | A1 | 11/2014 | Kim et al. | |
| 2015/0044412 | A1 | 2/2015 | Miyaji et al. | |
| 2015/0140244 | A1 | 5/2015 | Uekado et al. | |
| 2015/0184789 | A1 * | 7/2015 | Hirai | B32B 1/00 428/71 |
| 2016/0258670 | A1 | 9/2016 | Deka et al. | |
| 2017/0159995 | A1 | 6/2017 | Allo et al. | |
| 2017/0184341 | A1 | 6/2017 | Grimm et al. | |
| 2017/0276287 | A1 | 9/2017 | Kawarazaki et al. | |
| 2018/0313492 | A1 * | 11/2018 | Kitano | F25D 23/064 |

FOREIGN PATENT DOCUMENTS

| | | | | |
|---|---|---|---|---|
| DE | 4409091 | | 9/1995 | |
| EP | 1338854 | A1 * | 8/2003 | F25D 23/063 |
| GB | 846405 | | 8/1960 | |
| GB | 1545176 | | 5/1979 | |
| JP | S5222260 | | 2/1977 | |
| JP | S55108384 | | 7/1980 | |
| JP | S61107077 | | 5/1986 | |
| JP | S6470685 | A | 3/1989 | |
| JP | H02192577 | | 7/1990 | |
| JP | H02192580 | | 7/1990 | |
| RU | 142892 | | 7/2014 | |
| SU | 203707 | | 12/1967 | |
| SU | 547614 | | 2/1977 | |
| WO | 2004010042 | | 1/2004 | |
| WO | WO-2010127947 | A2 * | 11/2010 | F16L 59/065 |
| WO | 2016029963 | | 3/2016 | |

* cited by examiner

FILLING PORTS FOR INSULATED STRUCTURES INCORPORATED WITHIN AN APPLIANCE

CROSS-REFERENCE TO RELATED APPLICATIONS

The present application is a continuation of U.S. patent application Ser. No. 16/637,570 filed Feb. 7, 2020, now U.S. Pat. No. 11,300,354, entitled FILLING PORTS FOR INSULATED STRUCTURES INCORPORATED WITHIN AN APPLIANCE, which is a national stage of International Application No. PCT/US2017/055355 filed Oct. 5, 2017, entitled FILLING PORTS FOR INSULATED STRUCTURES INCORPORATED WITHIN AN APPLIANCE, the entire disclosures of which are hereby incorporated herein by reference.

FIELD OF THE DEVICE

The device is in the field of insulating structures used in appliances, and more specifically, filling ports that are incorporated within an appliance structure for disposing insulation material therein and sealing the structure to form an insulated appliance structure.

SUMMARY

In at least one aspect, an appliance includes an outer wrapper and an inner liner that form a structural cabinet having an insulating cavity defined between the inner liner and the outer wrapper. An elliptical insulation port is defined within the outer wrapper, wherein the elliptical insulation port is configured to allow passage of a cylindrical insulation conduit when the insulation conduit is positioned at an oblique angle relative to the structural cabinet. An insulation material is disposed within the insulating cavity. A sealing cap covers the elliptical insulation port, wherein the sealing cap includes a protrusion that extends at least partially into the insulating cavity.

In at least another aspect, an insulated structure for an appliance includes an outer wrapper and an inner liner that define an insulating cavity therebetween, wherein an insulation port is defined within the outer wrapper. An insulation material is disposed within the insulating cavity, wherein the insulation material is disposed within the insulating cavity via the insulation port. A sealing cap covers the insulation port. The sealing cap includes a protrusion that extends at least partially through the insulation port. A hinge bracket is disposed on the outer wrapper and conceals the sealing cap. The hinge bracket is configured to receive a hinge for rotationally operating a door panel relative to the outer wrapper.

In at least another aspect, a method for forming an insulated structure includes disposing an outer structure at an angle with respect to an insulation conduit. The insulation conduit is positioned through an insulation port defined within the outer structure. The insulation conduit is positioned at an oblique angle with respect to the insulation port. An insulation material is disposed into an insulating cavity of the outer structure via the insulation conduit. Gravity feeds the insulation material throughout the insulating cavity. A sealing cap is disposed into the insulation port. The sealing cap is sealed into the insulation port to define a sealed insulating structure.

These and other features, advantages, and objects of the present device will be further understood and appreciated by those skilled in the art upon studying the following specification, claims, and appended drawings.

DETAILED DESCRIPTION OF EMBODIMENTS

Figure 1:
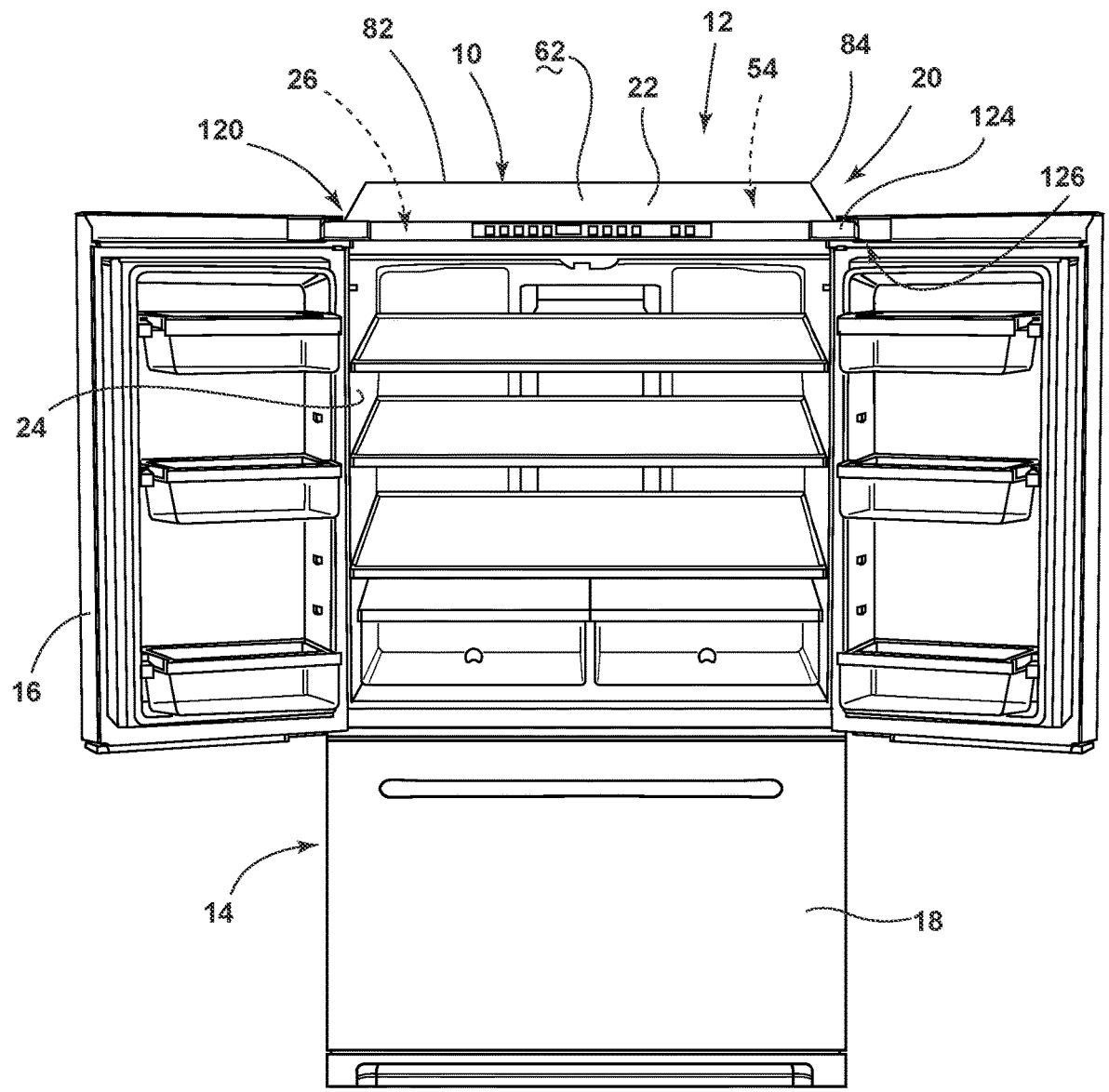
FIG. 1 is a front perspective view of a refrigerating appliance incorporating an aspect of a filling port system for disposing an insulation material within the insulating cabinet.
Figure 2:
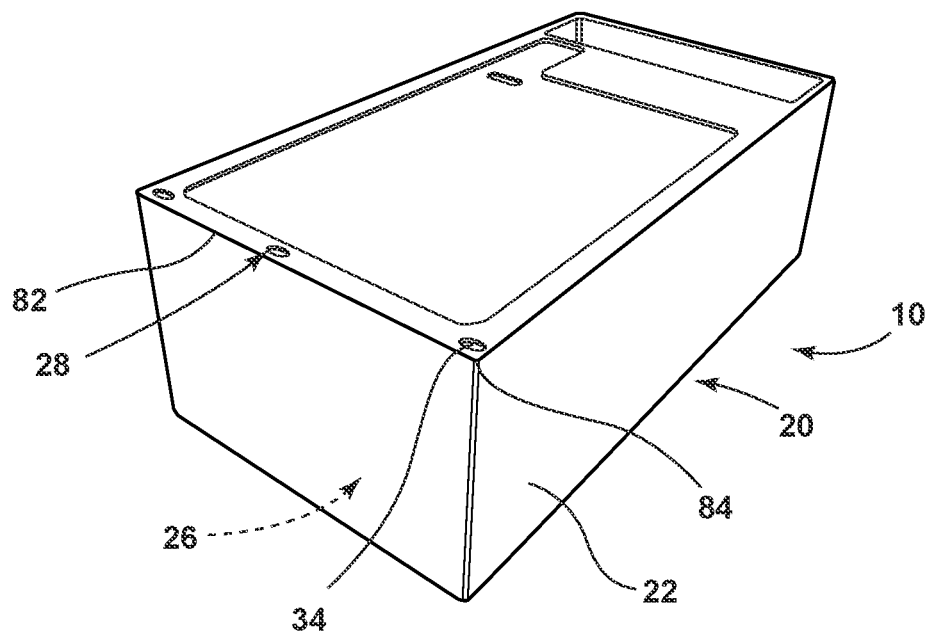
FIG. 2 is a top perspective view of a back surface of a structural cabinet for an appliance and showing the filling ports disposed within the structural cabinet.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-6, reference numeral 10 generally refers to an outer structure that is used in an appliance 12. According to various aspects of the device, the outer structure 10 can be in the form of an operable panel 14, such as a door panel 16 or drawer panel 18. The outer structure 10 can also be in the form of a structural cabinet 20 to which one or more operable panels 14 can be connected. The appliance 12 can include an outer structure 10 having an outer wrapper 22 and an inner liner 24 that cooperate to form the outer structure 10. The outer structure 10 includes an insulating cavity 26 defined between the inner liner 24 and the outer wrapper 22. An insulation port 28 and, typically, an elliptical insulation port, is defined within the outer wrapper 22. The insulation port 28 is configured to allow passage of an insulation conduit 30 when the insulation conduit 30 is positioned at an oblique angle 32 relative to the structural cabinet 20. Typically, the insulation conduit 30 will include a generally cylindrical conduit or tube. In this manner, the insulation conduit 30 engages and extends at least partially through the insulation port 28. Because the insulation conduit 30 is positioned at an oblique angle 32, the elliptical aperture 34 of the insulation port 28 is configured such that the insulation conduit 30 extends through the insulation port 28 at the oblique angle 32 and defines a close engagement between the exterior surface 42 of the insulation conduit 30 and the elliptical aperture 34 of the insulation port 28. An insulation material 36 is disposed within the insulating cavity 26, wherein the insulation material 36 is delivered to the insulating cavity 26 via the insulation conduit 30 passing the insulation material 36 through the insulation port 28. A sealing cap 38 is attached to the outer wrapper 22 at the insulation port 28. In this manner, the sealing cap 38 covers and at least partially conceals the insulation port 28. The sealing cap 38 includes a protrusion 40 that extends at least partially into the insulating cavity 26 via the insulation port 28.

Referring again to FIGS. 1-6, the protrusion 40 of the sealing cap 38 is configured to extend through the insulation port 28 and at least partially engage the insulation material 36 disposed within the insulating cavity 26. When the insulation material 36 is disposed within the insulating cavity 26, the insulation material 36 is positioned to completely fill the insulating cavity 26, and in certain configurations, overflow the insulating cavity 26 so that the insulation material 36 extends at least partially outside of the insulation port 28. In this configuration, when the sealing cap 38 is disposed within the insulation port 28, the protrusion 40 engages the insulation material 36 and exerts a compressive force 50 against the insulation material 36. This compressive force 50 serves to extract at least a portion of the gas 52, such as air, within the insulating cavity 26 that can define an at least partial vacuum 54 within the insulating cavity 26.

Figure 4:
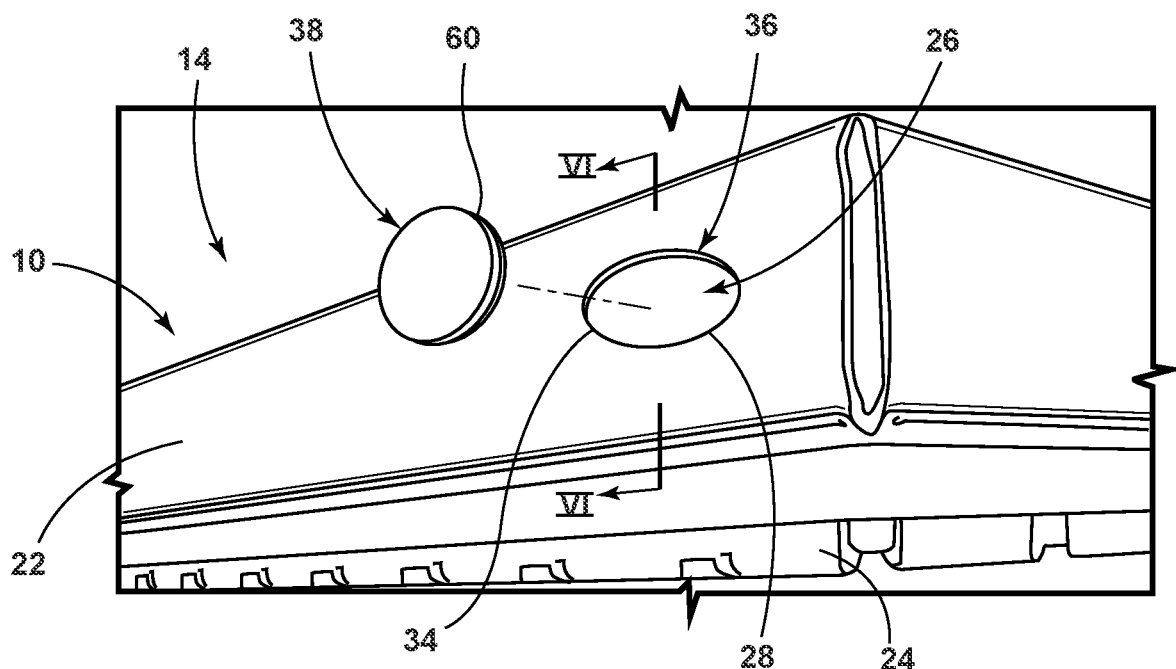
FIG. 4 is a top perspective view of an outer wrapper showing attachment of a sealing cap into an insulating port for sealing an insulating cavity for the appliance structure.
Figure 5:
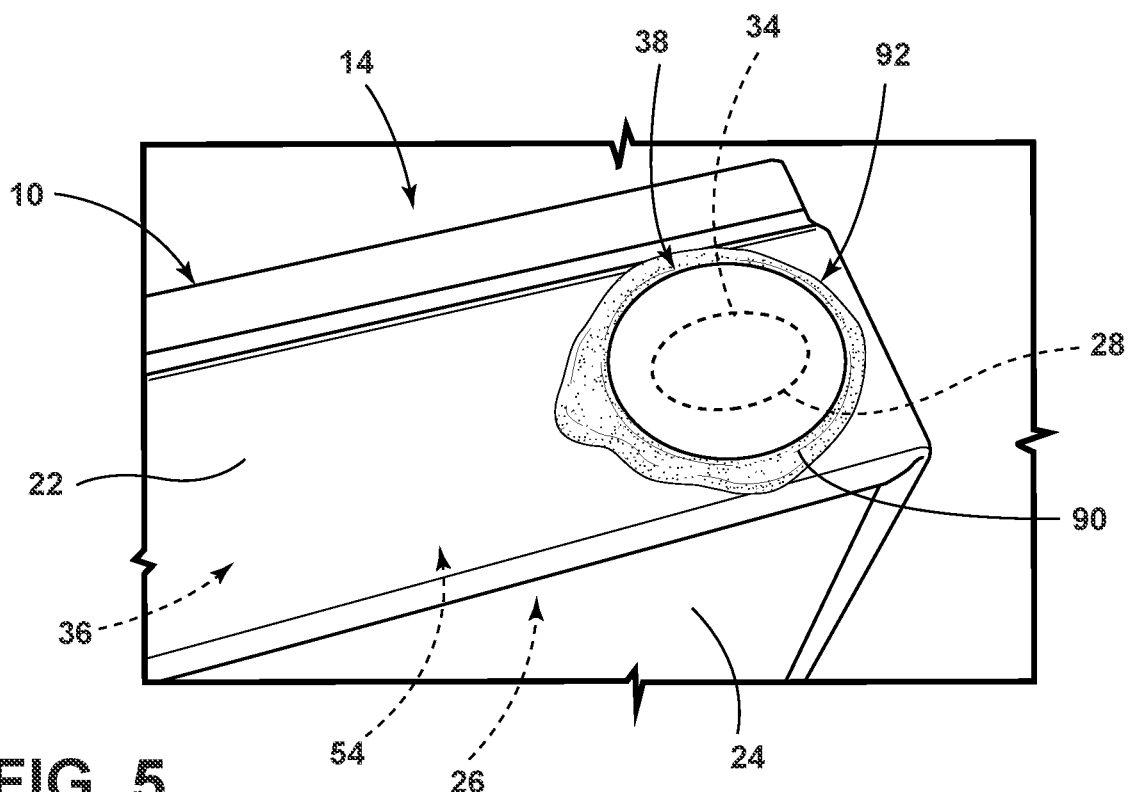
FIG. 5 is a top perspective view of the outer wrapper of FIG. 4 showing the sealing cap connected to the outer wrapper at the insulation port.
Figure 6:
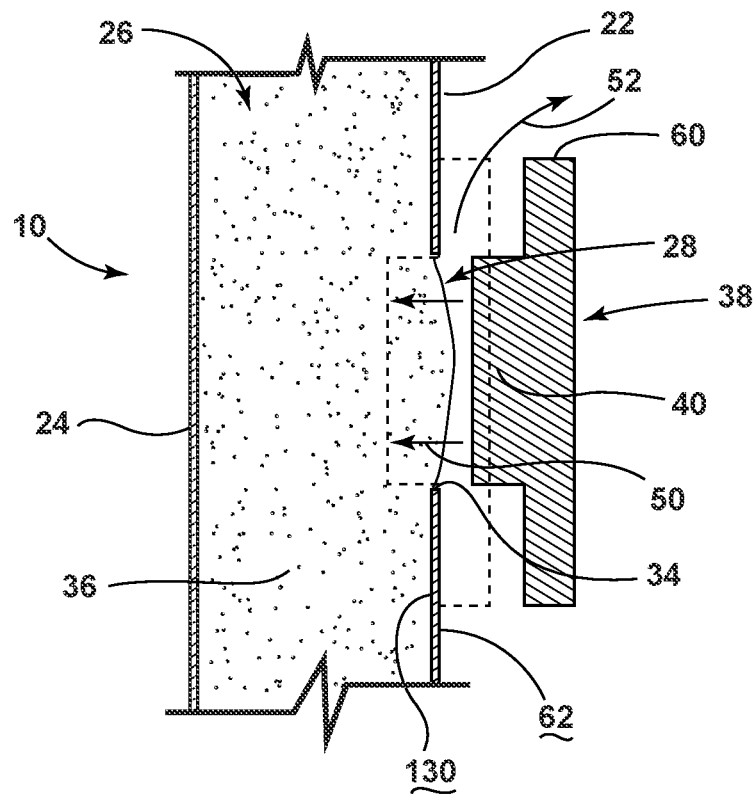
FIG. 6 is a cross-sectional view of the outer wrapper of FIG. 4 taken along line VI-VI and showing the sealing cap being disposed into the insulation port.

As exemplified in FIGS. 4-6, the sealing cap 38 typically includes an outer flange 60 that engages an outer surface 62 of the outer wrapper 22 proximate the insulation port 28. The protrusion 40 extends outward from the outer flange 60. In this manner, when the outer flange 60 engages the outer wrapper 22, the protrusions 40 extend through the insulation port 28 and into the insulating cavity 26 to provide the compressive force 50 against the insulation material 36. Where the insulation port 28 is generally elliptical in shape, the outer flange 60 can be substantially circular and the protrusion 40 can have an elliptical cross section that substantially matches the shape of the elliptical aperture 34 of the insulation port 28.

Figure 7:
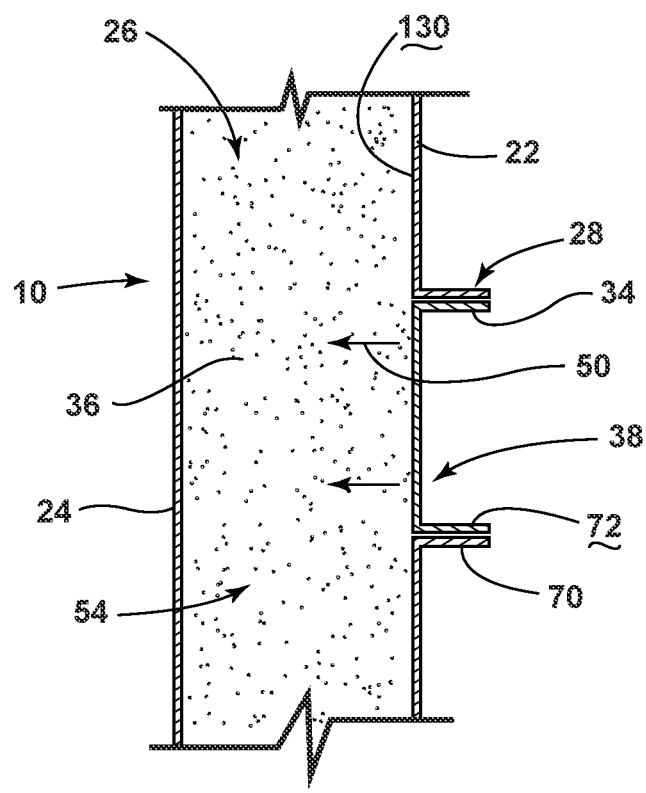
FIG. 7 is a cross-sectional view of an outer wrapper showing an aspect of the insulation port with the sealing cap disposed therein.
Figure 8:
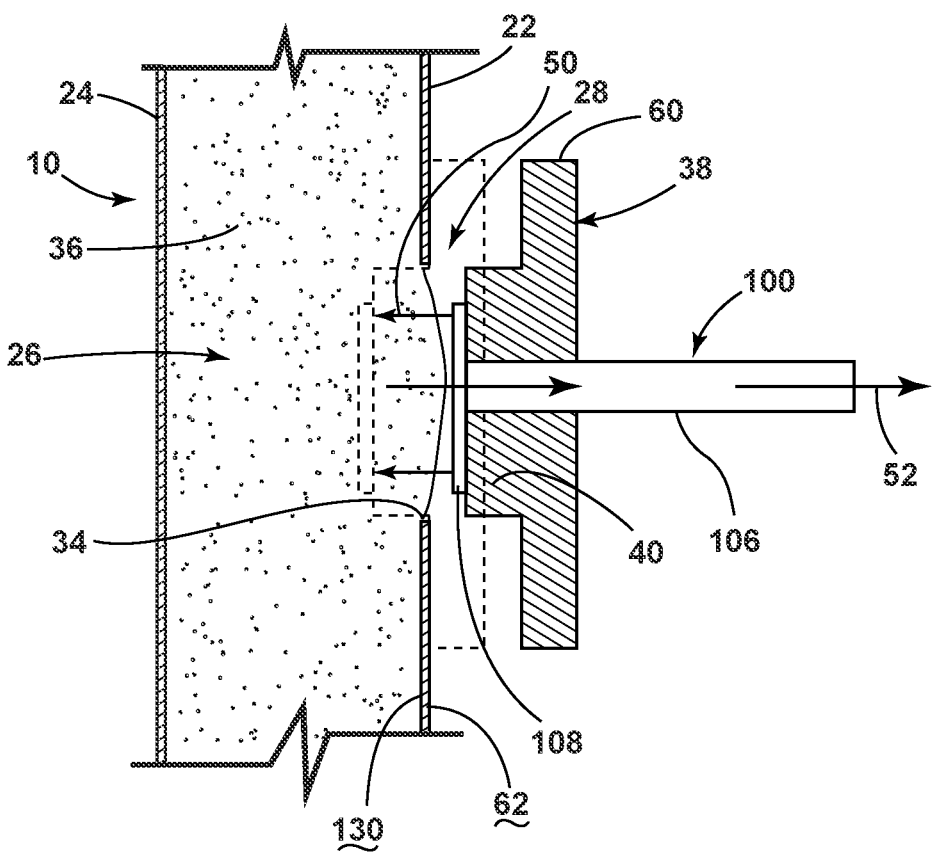
FIG. 8 is a cross-sectional view of a structural cabinet taken at an insulation port and showing a sealing cap that includes an integral vacuum port for expressing gas from within the insulating cavity.
Figure 9:
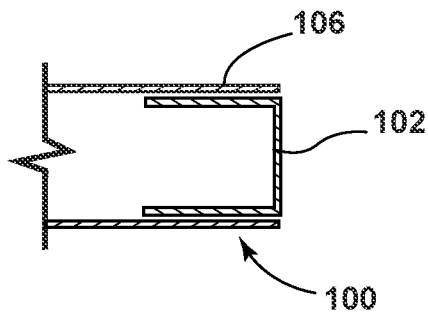
FIG. 9 is a cross-sectional view of the vacuum port of FIG. 8 and showing a cap disposed within the vacuum port.
Figure 10:
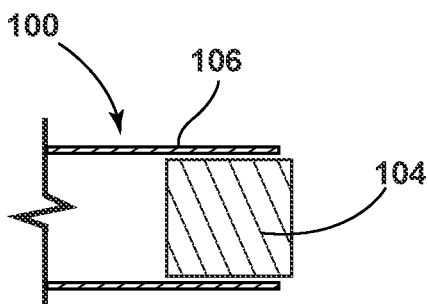
FIG. 10 is a cross-sectional view of the vacuum port of FIG. 8 and showing a plug disposed therein for sealing the vacuum port.
Figure 11:
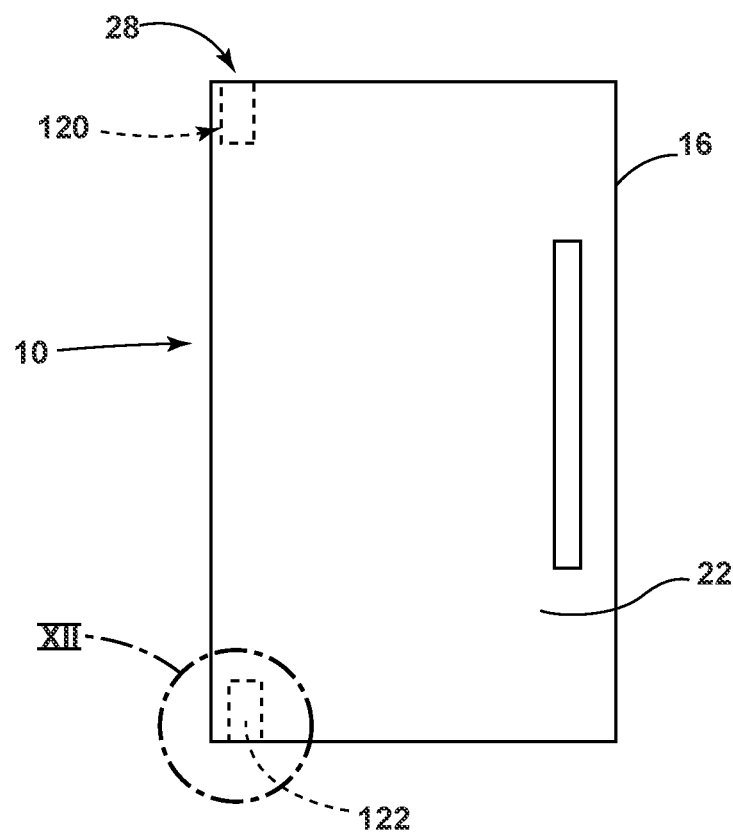
FIG. 11 is a front elevational view of a door panel for an appliance and showing upper and lower hinge receptacles that incorporate an aspect of the insulation port defined therein.
Figure 12:
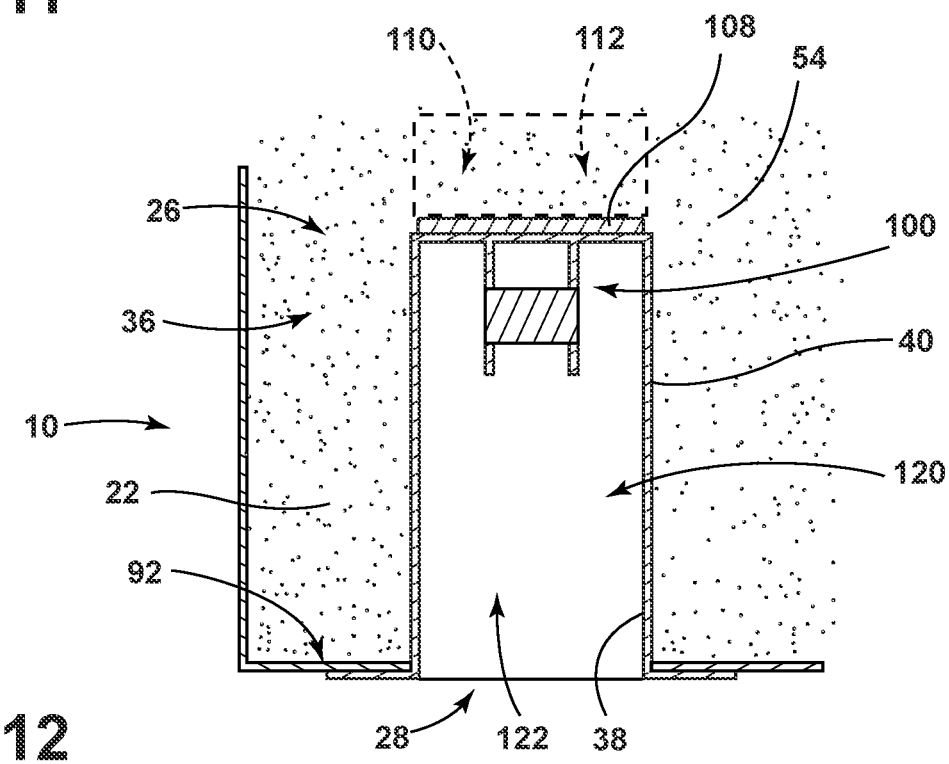
FIG. 12 is an enlarged cross-sectional view of the insulation port of FIG. 11 and showing the sealing cap and vacuum port disposed therein.
Figure 13:
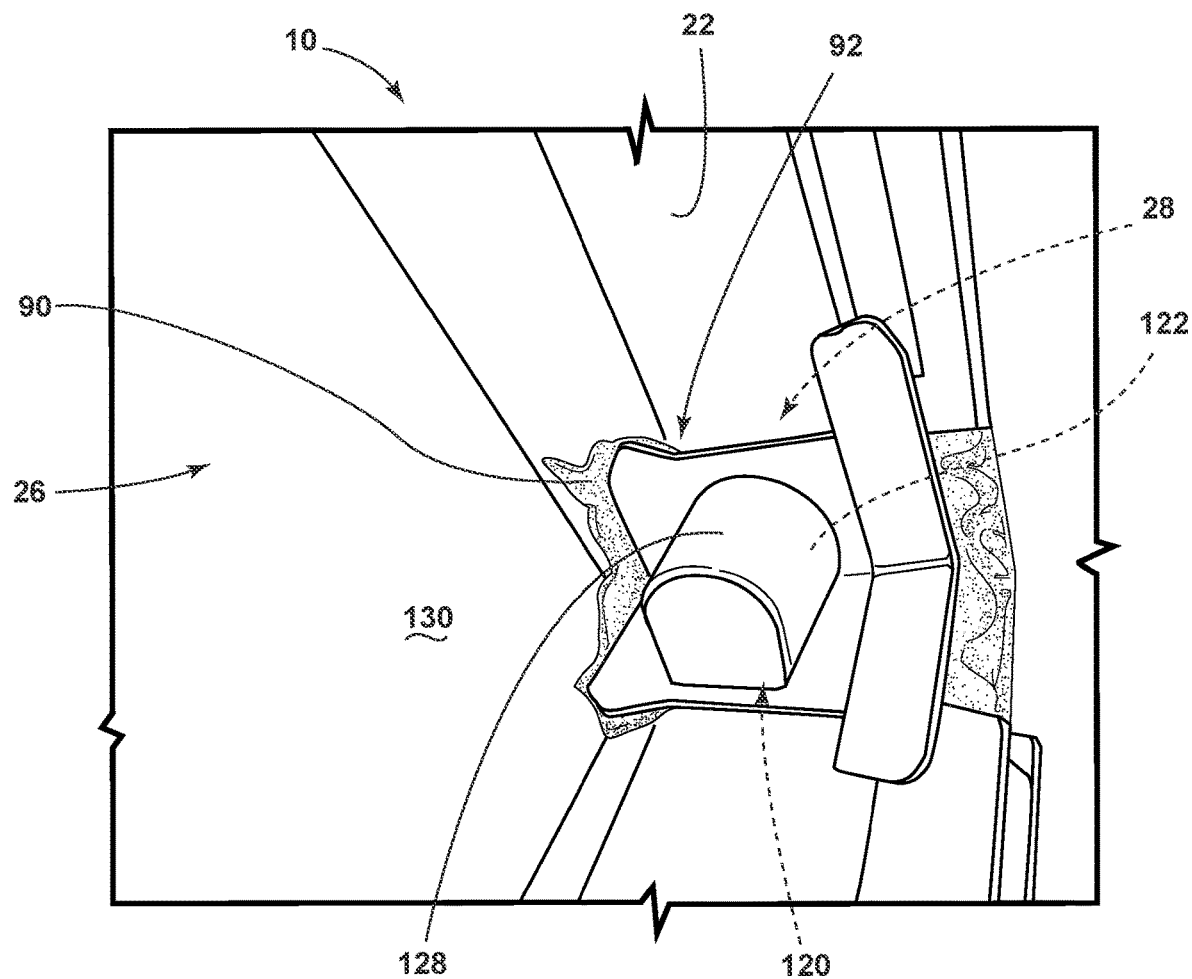
FIG. 13 is an interior perspective view of an outer wrapper for an appliance and showing the reinforcing member disposed proximate the hinge receptacle.
Figure 14:
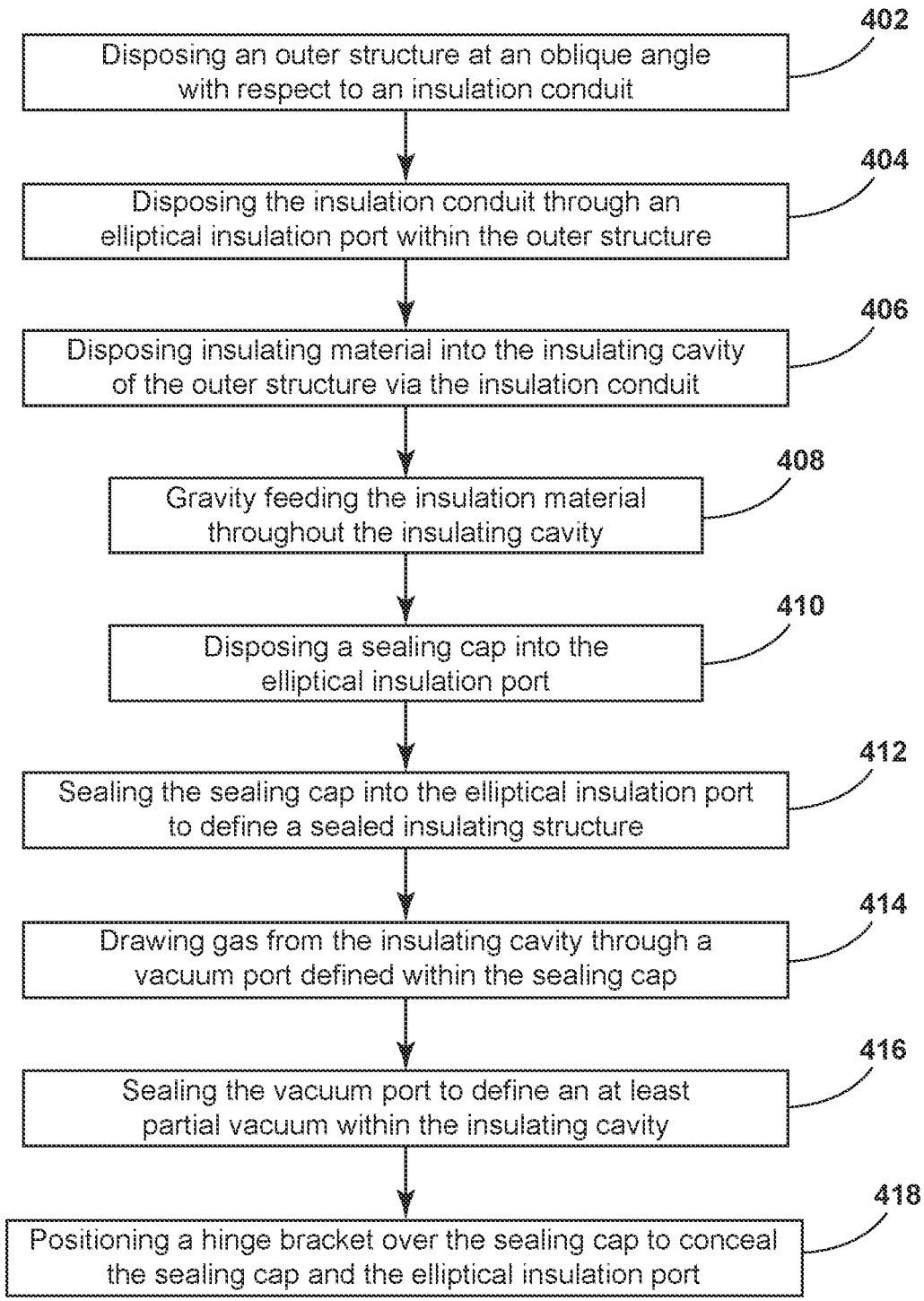
FIG. 14 is a linear flow diagram illustrating a method for forming an insulating structure using an elliptical insulation port.

Referring now to FIG. 7, in various aspects of the device, the insulation port 28 can be defined by a perimetrical flange 70 that extends perpendicularly from the elliptical aperture 34 defined within the outer wrapper 22. In such an embodiment, an inner surface 72 of the perimetrical flange 70 is adapted to receive the sealing cap 38. Typically, the perimetrical flange 70 extends away from the insulating cavity 26. It should be understood that the perimetrical flange 70 can also be configured to extend into the insulating cavity 26. In either configuration, the sealing cap 38 is adapted to seal the insulating cavity 26. In various aspects of the device, the sealing cap 38 is adapted to exert the compressive force 50 against the insulation material 36.

Referring again to FIGS. 1-7, the use of the elliptical insulation port 28 allows for convenient deposition of the insulation material 36 through the cylindrical insulation conduit 30 when the outer structure 10 is disposed at the oblique angle 32 with respect to the insulation conduit 30. As the insulation material 36 is moved through the insulation conduit 30 in a generally vertical and downward direction 80, the insulation material 36 enters the insulating cavity 26 of the outer structure 10. Because the outer structure 10 is disposed at an oblique angle 32, the insulation material 36 disposed therein tends to flow downward according to the force of gravity. The positioning of the outer structure 10 at the oblique angle 32 is used in cooperation with the positioning of the one or more elliptical insulation ports 28 along a top edge 82 and typically a top corner 84 of the outer wrapper 22 for the outer structure 10. Accordingly, the oblique angle 32 of the outer structure 10 allows the insulation material 36 to flow downward and substantially occupy the entire insulating cavity 26. According to various aspects of the device, additional mechanisms can be used to move the insulation material 36 through the entire insulating cavity 26. Such mechanisms can include, but are not limited to, vibrating the outer structure 10, blowing air within the insulating cavity 26, physical compaction, liquid compaction, combinations thereof, and other similar insulation delivery processes and mechanisms.

After the insulation material 36 is disposed throughout the entire insulating cavity 26, the sealing cap 38 is coupled with the outer wrapper 22 proximate the insulation port 28. The sealing cap 38 can be engaged to the outer wrapper 22 using various mechanisms that can include, but are not limited to, adhesives 90, welding, mechanical fasteners, combinations thereof, and other similar attaching mechanisms. Typically, an adhesive 90 is used to attach the sealing cap 38 to the outer wrapper 22, wherein the adhesive 90 can form a substantially air-tight seal 92 between the sealing cap 38 and the outer wrapper 22.

Referring now to FIGS. 8-12, the sealing cap 38 can include an integral vacuum port 100 that extends through the sealing cap 38. In such an embodiment, the vacuum port 100 can be used to express gas 52 from the insulating cavity 26. After the desired amount of gas 52 has been expressed from the insulating cavity 26, the vacuum port 100 that is integrally formed within the sealing cap 38 can be sealed to define an at least partial vacuum 54 within the insulating cavity 26. In various aspects of the device, the vacuum port 100 can be sealed by crimping the vacuum tube 106. The vacuum port 100 can also be sealed by using an end cap 102, a plug 104 or through various crimping processes capable of forming a substantially air-tight seal 92 at the vacuum port 100. This substantially air-tight seal 92 serves to prevent or substantially prevent gas 52 from infiltrating into the insulating cavity 26 and degrading the at least partial vacuum 54 defined therein.

Typically, the vacuum port 100 will extend through a central portion of the sealing cap 38. In this manner, the vacuum tube 106 will extend through each of the outer flange 60 and the protrusion 40. During the expression of gas 52 from the insulating cavity 26 through the vacuum port 100, a filter 108 can be disposed at the end of the vacuum port 100 proximate the protrusion 40. This filter 108 can be used to limit the movement of the insulation material 36 into the vacuum port 100. In various aspects of the device, one or more desiccants 110 can be used to absorb residual humidity and/or moisture that may be present within the insulating cavity 26. Additionally, one or more getters 112 can be used to remove residual gas 52 that may be present within or near the vacuum port 100.

Referring now to FIGS. 8-13, the insulation port 28 and sealing cap 38 can cooperate to define a hinge receptacle 120. According to various aspects of the device, the hinge receptacle 120 can be recessed within the outer wrapper 22. In such an embodiment, the hinge receptacle 120 can be a recess 122 that is adapted to receive a hinge bracket 124 that may include a hinge 126 or may attach to a hinge 126 for operating a door panel 16 relative to a structural cabinet 20 for an appliance 12. According to various aspects of the device, a reinforcing member 128 can be disposed on an interior surface 130 of the outer wrapper 22, where the reinforcing member 128 is attached proximate the insulation port 28 and serves to reinforce the outer wrapper 22 at the hinge receptacle 120.

Referring again to FIGS. 1-13, an insulated structure that can be used within an appliance 12 typically includes an outer wrapper 22 and an inner liner 24 that define an insulating cavity 26 therebetween. An insulation port 28 is defined within the outer wrapper 22. The inner liner 24 and outer wrapper 22 can be made of various materials, typically the inner liner 24 and outer wrapper 22 can be made of metal that is adhered and/or welded together. In various aspects of the device, the outer wrapper 22 can be metal and the inner liner 24 can be a plastic or other similar plastic-type material. An insulation material 36 is disposed within the insulating cavity 26. The insulation material 36 is disposed within the insulating cavity 26 via the insulation port 28 defined within the outer wrapper 22.

As discussed previously, the insulation port 28 is typically in the form of an elliptical insulation port 28 that can receive a cylindrical insulation conduit 30 that is positioned in a vertical orientation when the inner liner 24 and outer wrapper 22 are disposed at the oblique angle 32 with respect to the cylindrical insulation conduit 30. While the insulation port 28 is described herein as being elliptical, the insulation port 28 can be defined by various shapes and configurations. These shapes and configurations of the insulation port 28 can include, but are not limited to, oval, rectilinear, polygonal, circular, arcuate, irregular, combinations thereof and other similar shapes that are able to receive the insulation conduit 30 at the oblique angle 32 as well as the sealing cap 38. Additionally, while the shape of the insulation conduit 30 is described as being cylindrical, the insulation conduit 30 can be defined by various shapes and configurations similar to those described above with respect to the insulation port 28. According to the various embodiments, the insulation port 28 and the insulation conduit 30 are configured to allow for deposition of the insulation material 36 into the insulating cavity 26 when the insulation conduit 30 and the outer structure 10 are positioned at an oblique angle 32 relative to one another.

The insulation material 36 can be any one of various insulating components that can include, but are not limited to, an insulating powder, insulating foam, granular insulation, microspheres, nanospheres, silica-based material, various ash-based material, combinations thereof and other similar insulating components.

A sealing cap 38 is attached to the outer wrapper 22 and covers the insulation port 28. The sealing cap 38 includes the protrusion 40 that extends at least partially into the insulating cavity 26 and applies a compressive force 50 to the insulation material 36 therein. A hinge bracket 124 is disposed on the outer wrapper 22 and at least substantially conceals, or at least partially conceals, the sealing cap 38 and the insulation port 28. The hinge bracket 124 is configured to receive a hinge 126 for rotationally operating a door panel 16 relative to the insulated structure. As discussed previously, the insulated structure can be in the form of a door panel 16 that is rotationally operable relative to a structural cabinet 20. In various aspects, the insulated structure can also be a structural cabinet 20 that receives a rotationally operable door panel 16.

Referring again to FIGS. 8-13, the insulation port 28 can define a port recess 122 within the outer wrapper 22. When the sealing cap 38 is used to seal the insulating cavity 26, the sealing cap 38 is disposed within the port recess 122 to define a substantially air-tight seal 92. The sealing cap 38 can include a vacuum port 100 that extends through the sealing cap 38. In such an embodiment, the vacuum port 100 is sealed to define an at least partial vacuum 54 within the insulating cavity 26. During the expression of gas 52 from the insulating cavity 26 as the insulated structure is being manufactured, various filters, getters 112, and desiccants 110 can be incorporated proximate the protrusion 40 of the sealing cap 38 or proximate the end of the vacuum port 100 for assisting the expression of gas 52 from the insulating cavity 26. The filter 108 can prevent the movement of the insulation material 36 into and through the vacuum port 100. The getters 112 and desiccants 110 are used, typically, to remove residual gas 52 and moisture that may be present within the insulating cavity 26. To maintain the at least partial vacuum 54 within the insulating cavity 26, the vacuum port 100 can be sealed via a plug 104, end cap 102, or through various crimping processes that create a substantially air-tight seal 92 within the vacuum port 100.

The insulation port 28 can include a cut-out or other aperture defined within the outer wrapper 22. It is also contemplated that the insulation port 28 can include a perimetrical flange 70 that extends perpendicularly from the elliptical aperture 34 defined within the outer wrapper 22. In such an embodiment, an inner surface 72 of the perimetrical flange 70 receives the sealing cap 38. Additionally, where a perimetrical flange 70 is used, the sealing cap 38 can be welded to the outer wrapper 22 at the elliptical aperture 34 and the perimetrical flange 70.

Referring now to FIGS. 1-14, having described various aspects of the system for depositing an insulation material 36 within an insulated structure, a method 400 is disclosed for forming an insulated structure. According to various aspects of the device, the method 400 can include a step 402 of disposing an outer structure 10 at an angle with respect to a substantially cylindrical insulation conduit 30. Typically, the outer structure 10 is disposed at the oblique angle 32, such that it is tilted with respect to a vertically positioned insulation conduit 30. The insulation conduit 30 is then positioned through an elliptical insulation port 28 defined within the outer structure 10 (step 404). The insulation conduit 30 is positioned at the oblique angle 32 with respect to the elliptical insulation port 28. In this manner, the cylindrical shape of the insulation conduit 30 matches the shape of the elliptical insulation port 28 that is positioned at the oblique angle 32 and defined within the outer structure 10. Because the insulation conduit 30 engages and, in various aspects, passes through the elliptical insulation port 28, the elliptical shape of the insulation port 28, when at the oblique angle 32, substantially conforms to the exterior surface 42 of the cylindrical insulation conduit 30.

The insulation material 36 is then disposed into the insulating cavity 26 of the outer structure 10 via the insulation conduit 30 (step 406). The insulation material 36 is then gravity-fed throughout the insulating cavity 26 (step 408). As discussed previously, because the outer structure 10 is positioned at the oblique angle 32, the insulation material 36 is allowed to flow according to the force of gravity throughout substantially the entire insulating cavity 26. When positioned at the oblique angle 32, the interior surface 130 of the outer structure 10 typically includes very few, if any, horizontal surfaces that might prevent the insulation material 36 from flowing throughout the insulating cavity 26.

Referring again to FIGS. 1-14, once the insulation material 36 is disposed throughout the insulating cavity 26, a sealing cap 38 is disposed onto the elliptical insulation port 28 (step 410). The sealing cap 38 is then sealed into the elliptical insulation port 28 and against the outer wrapper 22 to define a sealed insulating structure (step 412). This sealed structure defines an insulating cabinet.

Referring again to FIGS. 1-14, according to various aspects of the device, when the sealing cap 38 is attached to the outer wrapper 22, the protrusion 40 enters through the insulation port 28 and applies a compressive force 50 against the insulation material 36 disposed therein. This compressive force 50 can serve to express a minimal amount of gas 52 from the insulating cavity 26 that can be used to define an at least partial vacuum 54 within the insulating cavity 26. Typically, where an at least partial vacuum 54 is desired within the insulating cavity 26, gas 52 is drawn or otherwise expressed or expelled from the insulating cavity 26 through a vacuum port 100 defined within the sealing cap 38 (step 414). The vacuum port 100, after the gas 52 is sufficiently expelled, is sealed to define an at least partial vacuum 54 in the insulating cavity 26 (step 416).

Referring again to FIGS. 1-14, in various aspects of the device, the insulation port 28 and sealing cap 38 can cooperatively define a hinge receptacle 120. This hinge receptacle 120 is adapted to receive a hinge bracket 124 that is positioned over the sealing cap 38 (step 418). In such an embodiment, the hinge bracket 124 serves to at least partially conceal the sealing cap 38 and the elliptical insulation port 28 from view.

Figure 3:
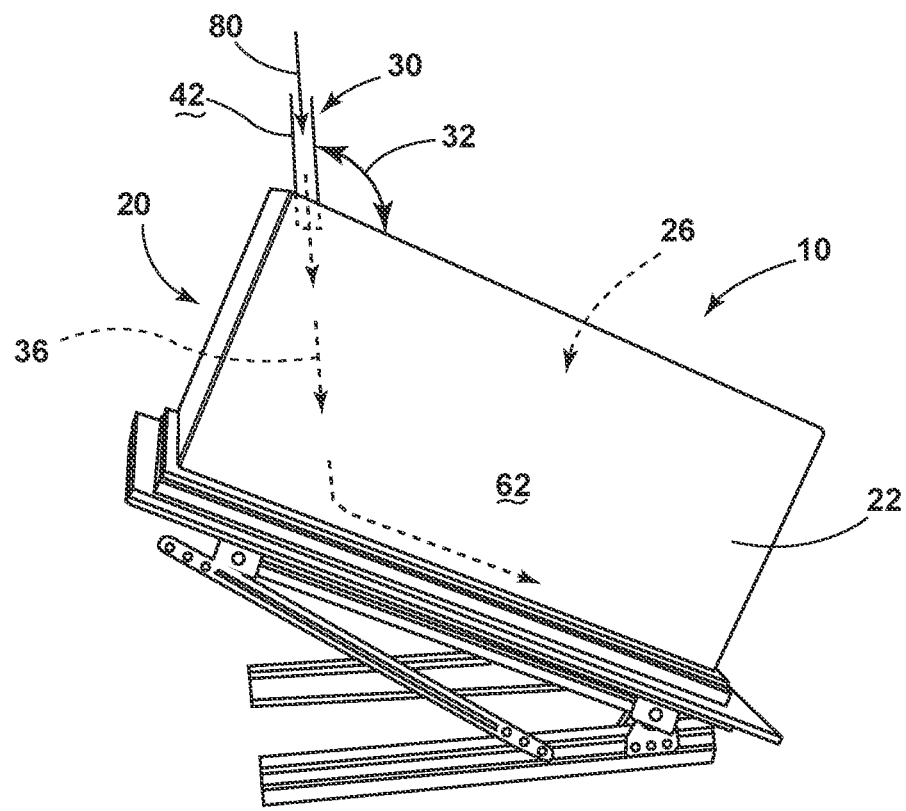
FIG. 3 is a side perspective view of a structural cabinet disposed at an angle and showing deposition of an insulation material within the structural cabinet.

According to various aspects of the device, as exemplified in FIG. 3, during the deposition of the insulation material 36 within the insulating cavity 26, the outer structure 10 can be disposed at an oblique angle 32 to allow for the movement of the insulation material 36 throughout the insulating cavity 26. Typically, the oblique angle 32 is configured to be approximately equal to or greater than an angle of repose for the insulation material 36. Accordingly, the oblique angle 32 allows for the gravitational flow of the insulation material 36 through the insulating cavity 26.

According to various aspects of the device, the outer structure 10 having the elliptical insulation port 28 can be incorporated within the various appliances 12. These appliances 12 can include, but are not limited to, refrigerators, freezers, washers, dryers, dishwashers, hot water heaters, coolers, combinations thereof, and other similar appliances 12 that may include an insulating structure and/or an insulated panel.

The outer structure 10 having the elliptical insulation port 28 described herein can be used to form various insulated structures that can be used within appliances 12. These insulated structures can include structural cabinets 20, door panels 16, drawer panels 18 and can also include insulated panels that can be disposed within a separate insulating system for a particular appliance 12.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulated structure for an appliance comprising:
   an outer wrapper and an inner liner that cooperatively form an insulating cavity therebetween;
   an insulation port defined within the outer wrapper, wherein the insulation port is configured to allow passage of an insulation-delivering conduit, wherein the insulation port is defined by a perimetrical flange that extends perpendicularly from an aperture defined within the outer wrapper, wherein the perimetrical flange extends away from the insulating cavity;
   an insulation material that is disposed within the insulating cavity;
   a sealing cap that covers the insulation port, wherein the sealing cap includes a protrusion that extends at least partially into the insulating cavity, wherein the insulation port and the sealing cap cooperate to define a hinge receptacle, wherein an inner surface of the perimetrical flange receives the sealing cap; and
   a hinge bracket that is attached to the hinge receptacle, wherein the hinge bracket conceals the sealing cap and the insulation port from view.

2. The insulated structure of claim 1, wherein the insulation port includes a reinforcing member that reinforces the outer wrapper at the hinge bracket.

3. The insulated structure of claim 2, wherein the reinforcing member is disposed on an interior surface of the outer wrapper.

4. The insulated structure of claim 1, wherein the insulation port is elliptical in shape and is configured to allow passage of the insulation-delivering conduit when the insulation-delivering conduit is positioned at an oblique angle relative to the outer wrapper, wherein the insulation-delivering conduit is cylindrical in shape.

5. The insulated structure of claim 1, wherein the sealing cap includes a vacuum port that extends through the sealing cap, wherein the vacuum port is sealed to define an at least partial vacuum within the insulating cavity.

6. The insulated structure of claim 5, wherein the vacuum port of the sealing cap is crimped to define a substantially air-tight seal.

7. The insulated structure of claim 1, wherein a reinforcing member is attached to the insulation port that reinforces the outer wrapper at the hinge bracket.

8. The insulated structure of claim 7, wherein the reinforcing member is disposed on an interior surface of the outer wrapper.

9. An insulated structure comprising:
   an outer wrapper and an inner liner that define an insulating cavity therebetween, wherein an insulation port is defined within the outer wrapper;
   an insulation material that is disposed within the insulating cavity, wherein the insulation material is disposed within the insulating cavity via the insulation port, wherein the insulation port includes an aperture defined within the outer wrapper, wherein the aperture is configured to allow passage of an insulation conduit, wherein the insulation port is elliptical in shape and is configured to allow passage of the insulation conduit when the insulation conduit is positioned at an oblique angle relative to the outer wrapper, wherein the insulation conduit is cylindrical in shape;
   a sealing cap that covers the insulation port, wherein the sealing cap includes a protrusion that extends at least partially through the insulation port, wherein the sealing cap includes a vacuum port that extends through the sealing cap, wherein the vacuum port is sealed to define an at least partial vacuum within the insulating cavity; and
   a hinge bracket that is disposed on the outer wrapper and conceals the sealing cap and the vacuum port, wherein the hinge bracket is configured to receive a portion of a hinge.

10. The insulated structure of claim 9, wherein the sealing cap includes a protrusion that extends at least partially into the insulating cavity.

11. The insulated structure of claim 9, wherein the outer wrapper and the inner liner define a rotationally operable door panel and the hinge bracket receives the portion of the hinge that is attached to a structural cabinet.

12. The insulated structure of claim 9, wherein the outer wrapper and the inner liner define a structural cabinet, and wherein the hinge bracket includes the portion of the hinge that extends to a rotationally operable door panel.

13. The insulated structure of claim 9, wherein the insulation port defines a port recess within the outer wrapper and the sealing cap is disposed within the port recess.

14. The insulated structure of claim 9, wherein the insulation port includes a reinforcing member that reinforces the outer wrapper at the hinge bracket, and wherein the reinforcing member is disposed on an interior surface of the outer wrapper.

15. The insulated structure of claim 9, wherein the insulation port is defined by a perimetrical flange that extends perpendicularly from an aperture defined within the outer wrapper, wherein an inner surface of the perimetrical flange receives the sealing cap.

16. The insulated structure of claim 15, wherein the perimetrical flange extends away from the insulating cavity.

17. An insulated structure for an appliance comprising:
   an outer wrapper and an inner liner that cooperatively form an insulating cavity therebetween;
   an insulation port defined within the outer wrapper, wherein the insulation port is configured to allow passage of an insulation-delivering conduit;
   a sealing cap that covers the insulation port, wherein the sealing cap includes a protrusion that extends at least partially into the insulating cavity, wherein the insulation port and the sealing cap cooperate to define a hinge receptacle, wherein the sealing cap includes a vacuum port that extends through the sealing cap, wherein the vacuum port is sealed to define an at least partial vacuum within the insulating cavity, and wherein the vacuum port of the sealing cap is crimped to define a substantially air-tight seal; and
   a hinge bracket that is attached to the hinge receptacle, wherein the hinge bracket conceals the sealing cap and the insulation port from view.

* * * * *